(12) United States Patent
Sekiguchi

(10) Patent No.: US 7,767,012 B2
(45) Date of Patent: Aug. 3, 2010

(54) RECORDING LIQUID, LIQUID CARTRIDGE, LIQUID DISCHARGE DEVICE, AND LIQUID DISCHARGE METHOD

(75) Inventor: Hideki Sekiguchi, Kanagawa (JP)

(73) Assignee: Sony Corporation, Tokyo (JP)

(*) Notice: Subject to any disclaimer, the term of this patent is extended or adjusted under 35 U.S.C. 154(b) by 728 days.

(21) Appl. No.: 11/610,781

(22) Filed: Dec. 14, 2006

(65) Prior Publication Data

US 2007/0139500 A1 Jun. 21, 2007

(30) Foreign Application Priority Data

Dec. 16, 2005 (JP) .................... P2005-363433

(51) Int. Cl.
*C09D 11/00* (2006.01)
(52) U.S. Cl. .............. 106/31.58; 106/31.59; 106/31.86; 106/31.89
(58) Field of Classification Search .............. 106/31.58, 106/31.86, 31.59, 31.89
See application file for complete search history.

(56) References Cited

U.S. PATENT DOCUMENTS 5,356,464 A * 10/1994 Hickman et al. ......... 106/31.36
5,876,491 A    3/1999 Gunn et al.

FOREIGN PATENT DOCUMENTS

| EP | 0447872 A2 * | 3/1991 |
|---|---|---|
| JP | 07-070491 | 3/1995 |
| JP | HEI 07-310037 A | 11/1995 |
| JP | 08-193177 | 7/1996 |
| JP | 08-290656 | 11/1996 |
| JP | 10-046075 | 2/1998 |
| JP | HEI 11-511770 T | 10/1999 |
| JP | 2000-15342 | 6/2000 |
| JP | 2001-002964 | 1/2001 |
| JP | 2002-036522 | 2/2002 |
| JP | 2003-192966 A | 7/2003 |
| JP | 2004-107481 A | 4/2004 |
| JP | 2005-281701 A | 10/2005 |

OTHER PUBLICATIONS

Japanese Patent Office, Office Action issued in Patent Application JP 2005-363433, on Dec. 15, 2009.

* cited by examiner

*Primary Examiner*—Jerry Lorengo
*Assistant Examiner*—Veronica Faison Gee
(74) *Attorney, Agent, or Firm*—Sonnenschein Nath & Rosenthal, LLP

(57) ABSTRACT

A recording liquid to be attached in a droplet state to an object for the purpose of recording on the object is disclosed, which contains a coloring matter, a solvent for dissolving or dispersing the coloring matter therein, and at least one cyclic aliphatic compound represented by the following chemical formula (1):

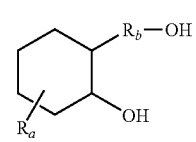

(1)

wherein Ra and Rb each represents an alkyl group of from 1 to 3 carbon atoms and are satisfied with the relation of [$2 \leq (Ra+Rb) \leq 4$].

4 Claims, 7 Drawing Sheets

RECORDING LIQUID, LIQUID CARTRIDGE, LIQUID DISCHARGE DEVICE, AND LIQUID DISCHARGE METHOD

CROSS REFERENCES TO RELATED APPLICATIONS

The present invention contains subjects related to Japanese Patent Application JP 2005-363433 filed in the Japan Patent Office on Dec. 16, 2005, the entire contents of which being incorporated herein by reference.

BACKGROUND OF THE INVENTION

1. Field of the Invention

The invention relates to a recording liquid to be attached in a droplet state to an object for the purpose of recording on the object, to a liquid cartridge having this recording liquid accommodated therein, and to a liquid discharge device and a liquid discharge method of forming an ink accommodated in this liquid cartridge in a droplet state and discharging it onto an object from a discharge nozzle.

2. Description of the Related Art

A printer device of an inkjet system feeds an ink of a recording liquid into an ink discharge head for discharging the ink onto recording paper which is an object from an ink cartridge having the ink accommodated therein, discharges the ink in a droplet state onto the recording paper through a nozzle from the ink discharge head and impacts the ink onto the recording paper, thereby printing images or letters. A printer device using this inkjet system has such an advantage that it is easy to attain low running costs, miniaturization of device and colorization of printed images.

Examples of an inkjet recording system include a diffraction system, a cavity system, a thermojet system, a Bubble Jet (registered trademark) system, a thermal inkjet system, a slit jet system, and a spark jet system.

An ink used for such an inkjet recording system is required to cause no nozzle clogging. With respect to the nozzle clogging, for example, a fine bubble generated in the ink is one of primary factors.

Though a prescribed amount of a gas such as air is dissolved in an ink, when the solubility of the gas decreases with an increase of the temperature, the gas which has not been completely dissolved in the ink is separated and becomes a fine bubble in the ink. Concretely, in a printer device, when the temperature of an ink present in an ink cartridge from which the ink is fed into an ink discharge head or in an ink discharge head increases, the gas presented in a dissolved state in the liquid is released, whereby a fine bubble is formed in the ink.

In the ink discharge head, when such a fine bubble is present, there may be a possibility that the bubble comes into the nozzle, whereby deficient discharge is caused such that the ink cannot be discharged or the discharge direction of the ink is deviated due to the bubble which has come into the nozzle, blurring or deletion is caused on a printed image, and the quality of an image or letter is deteriorated.

In particular, an inkjet recording system by a thermal system or a Bubble Jet system is a recording system in which heat energy is applied to an ink, thereby forming the ink into a fine droplet, which is then discharged from a nozzle. Concretely, an ink is quickly heated by a heater as a heat energy source, formed in a droplet state by a pressure due to an air bubble formed by film boiling of the ink and discharged from a nozzle. For that reason, in the thermal system and the Bubble Jet system, the heat is accumulated in the vicinity of the heater, the temperature of the ink present in an ink passage is very likely increased, and the gas which has not been completely dissolved in the ink is separated, whereby a fine bubble is likely formed. Thus, in the thermal system and the Bubble Jet system, there may be a possibility that deficient discharge such as non-discharge of ink and bending of the discharge direction is remarkably caused.

In order to improve these problems, for example, JP-A-2001-2964 (Patent Document 1) and JP-A-10-46075 (Patent Document 2) propose to blend a propylene oxide addition polymer of a lower alcohol in an aqueous pigment ink. However, in these proposals, it is difficult to thoroughly control the formation of a fine bubble in an ink, and therefore, more improvements are demanded.

For example, JP-A-7-70491 (Patent Document 3), proposes to contain an ethylene oxide adduct of a higher secondary alcohol alkoxylate in an ink. This Patent Document 3 describes that this ink is excellent in discharge stability at the time of high-frequency drive, permeability into recording paper and dryness. However, in this ink, even when a compound having only ethylene oxide added to a higher secondary alcohol alkoxylate is contained, it is difficult to improve nozzle clogging due to a fine bubble. Concretely, when a compound having only 7 moles or more of ethylene oxide added therein is contained in an ink, bubbling is vigorous, and nozzle clogging becomes remarkable, too.

Accordingly, the ink used in the inkjet recording system is not only required such that bubbling is suppressed and that nozzle clogging is not caused but also required such that when printing is carried out on plain paper, i.e., so-called wood-free paper, such as copying paper and a writing pad, a lowering of optical density and deterioration of quality of images or letters such as bleeding of boundaries and unevenness of mixed color are not generated.

With respect to these requirements, for example, JP-A-2000-154342 (Patent Document 4) proposes to use a coloring matter resulting from treating a water-insoluble coloring matter with a polymer containing a sulfonic acid (salt) group and/or a polymer containing a phosphoric acid (salt) group and to further add a polymer containing a carboxylic acid (salt) group in an ink.

JP-A-8-290656 (Patent Document 5) proposes to blend an alginic acid having a ratio of D-mannuronic acid to L-glucuronic acid in the range of from 0.5 to 1.2 in an ink.

In addition, JP-A-8-193177 (Patent Document 6) proposes to blend at least one surfactant selected from fluorine based or silicon based surfactants and an alginic acid salt in an ink.

However, even in the inks described in the Patent Documents 4 to 6, it is difficult to obtain satisfactory results for preventing nozzle clogging and deterioration of quality of images or letters, and therefore, more improvements are demanded.

A problem due to a fine bubble formed in an ink is more remarkably caused in a printer device capable of achieving high-speed printing on recording paper, namely a line type printer device in which a range substantially the same as the width of recording paper is the discharge range of the ink (see, for example, JP-A-2002-36522 (Patent Document 7)).

That is, in the line type printer device, nozzles are arranged in parallel over a length substantially the same as the width of recording paper, and plural pressure producing elements for pressing an ink opposing to the respective nozzles are also provided over a length substantially the same as the width of recording paper.

On the other hand, in a serial printer device, since printing for one line is carried out by moving an ink discharge head in a width direction of recording paper, the number of pressure producing elements is smaller than that of those provided in the line type printer device.

For that reason, in comparison with the serial printer device, since in the line type printer device, many pressure-generating elements are heated at once in carrying out printing, the temperature of the ink is liable to increase. Thus, in the line type printer device, a fine bubble is likely formed so that a fault due to the formed fine bubble is remarkably caused.

In the line type printer device, since an ink is fed into all of the nozzles provided in a range substantially the same as the width of recording paper, an ink passage for feeding an ink into each nozzle from an ink cartridge is formed in a length substantially the same as the width of recording paper, too. For that reason, in the line type printer device, a distance of from the ink cartridge to each nozzle is long, the structure is complicated, a formed bubble is hardly removed, and a fault due to the fine bubble is remarkably caused.

In the line type printer device, since a discharge space of the ink in every nozzle line at which plural nozzles are arranged in parallel is extremely short, it is necessary to use an ink having excellent permeability into recording paper. In the line type printer device, when an ink having excellent permeability into recording paper is applied to plain paper or the like, there maybe a possibility that the optical density is lowered because the ink excessively bleeds in a depth direction, namely a thickness direction of the plain paper.

In the line type printer device, for example, when so-called color printing in which inks having a different color from each other are discharged onto recording paper to achieve printing is carried out, since before the ink impacted on the recording paper sufficiently permeates into the paper, droplets of a next color are impacted one after the other, there may be a possibility that bleeding of boundaries between the respective colors or unevenness of mixed color is caused.

SUMMARY OF THE INVENTION

It is desired to provide a recording liquid which suppresses bubbling, is excellent in discharge stability, is free from bleeding of boundaries and unevenness of mixed color and is able of achieving printing high-grade images or letters with a high optical density; a liquid cartridge having this recording liquid accommodated therein; and a liquid discharge device and a liquid discharge method capable of achieving printing of high-grade images or letters by using the recording liquid accommodated in this liquid cartridge.

According to an embodiment of the invention, there is provided a recording liquid to be attached in a droplet state to an object for the purpose of recording on the object, which contains a coloring matter, a solvent for dissolving or dispersing the coloring matter therein, and at least one cyclic aliphatic compound represented by the following chemical formula (1).

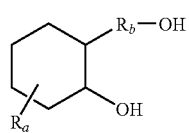

(1)

In the foregoing chemical formula (1), Ra and Rb each represents an alkyl group of from 1 to 3 carbon atoms and are satisfied with the relation of $[2 \leq (R_a + R_b) \leq 4]$.

It is preferable that the recording liquid further contains an ethylene oxide adduct of a branched alkyl diol represented by the following chemical formula (5).

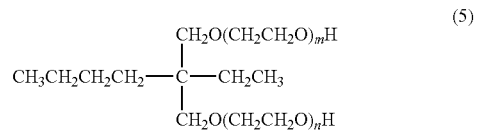

(5)

In the foregoing chemical formula (5), m and n each represents an integer of from 0 to 10 and are satisfied with the relation of $[1 \leq (m+n) \leq 10]$.

According to an embodiment of the invention, there is provided a liquid cartridge having the foregoing recording liquid accommodated therein.

According to an embodiment of the invention, there is provided a liquid discharge device including a device main body; a liquid cartridge having a recording liquid accommodated therein; a liquid compartment provided with a pressure producing element for pressing the recording liquid and a discharge nozzle for discharging the recording liquid; and a liquid discharge head connected to the liquid cartridge and having a feed passage for feeding the recording liquid accommodated in the liquid cartridge into the liquid compartment.

According to an embodiment of the invention, there is provided a liquid discharge method of discharging the foregoing recording liquid from the foregoing liquid discharge device.

According to the embodiments of the invention, by containing the cyclic aliphatic compound represented by the chemical formula (1) in the recording liquid, the wettability of the recording liquid is improved, the formation of a bubble in the recording liquid is suppressed, and clogging of the discharge nozzle due to the bubble is prevented from occurring. Thus, according to the embodiments of the invention, deficient discharge such as the generation of non-discharge during discharging the recording liquid from the discharge nozzle and bending of a discharge direction can be prevented.

According to the embodiments of the invention, by containing the cyclic aliphatic compound represented by the chemical formula (1) in the recording liquid, the wettability against an object is improved, and the recording liquid is diffused. Thus, high-grade images or letters which are free from blurring or deletion and high in optical density and are improved with respect to bleeding of boundaries and unevenness of mixed color can be recorded.

BRIEF DESCRIPTION OF THE DRAWINGS

FIGS. 5A and 5B each shows a valve mechanism of the connection part of an ink tank, in which FIG. 5A is a sectional view to show a state that a valve is closed, and FIG. 5B is a sectional view to show a state that a valve is opened.

FIGS. 6A and 6B each shows an ink discharge head, in which FIG. 6A is a sectional view to schematically show a state that an air bubble is formed in a heating resistor, and FIG. 6B is a sectional view to schematically show a state that an ink droplet is discharged from a nozzle.

DETAILED DESCRIPTION OF THE PREFERRED EMBODIMENTS

An ink to which an embodiment of the invention is applied, an ink cartridge, an inkjet printer device and a discharge method of an ink by the inkjet printer device will be hereunder described with reference to the accompanying drawings.

Figure 1:
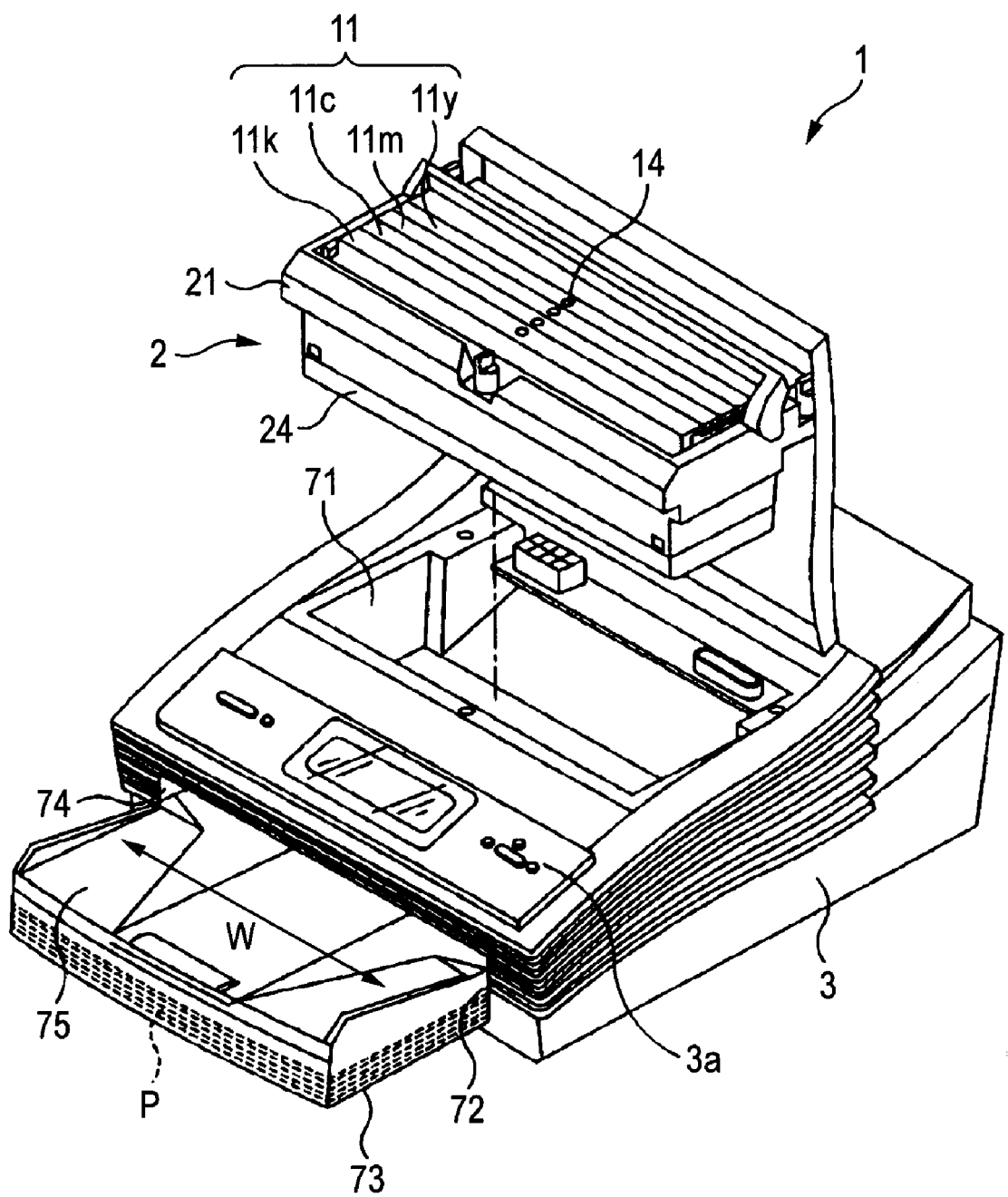
FIG. 1 is an oblique view to show a printer device to which an embodiment of the invention is applied.

An ink to which an embodiment of the invention is applied is, for example, used in an inkjet printer device 1 (hereinafter referred to as "printer device 1") as illustrated in FIG. 1. This printer device 1 is a line type printer device in which nozzles for discharging an ink are provided over a width direction of recording paper P. In this printer device 1, since the nozzles are provided over a width direction of the recording paper P and a pressure producing element for heating an ink is provided opposing to each of the nozzles, the number of pressure producing elements is large. The ink to which the embodiment of the invention is applied is able to suppress bubbling caused by a temperature increase of the ink due to heating of the plural pressure producing elements and an up-and-down movement of a valve mechanism and to improve the discharge stability. Furthermore, in the printer device 1, since a discharge space in every nozzle line at which plural nozzles are arranged in parallel over the width direction of the recording paper P is short, an ink of a next color is discharged one after the other. Even when an ink of a next color is discharged one after the other, the ink to which the embodiment of the invention is applied is excellent in permeability into the recording paper P and free from bleeding of boundaries and unevenness of mixed color and is able to form images or letters having a high optical density.

In the following, the ink to which the embodiment of the invention is applied will be first described, and the printer device using this ink as illustrated in FIG. 1 will be subsequently described.

The ink contains a coloring matter, a solvent for dissolving or dispersing this coloring matter therein, and a specified cyclic aliphatic compound.

Though dyes, pigments, colored polymer fine particles and so on which are known in the art can be used singly or in admixture as the coloring matter, water-soluble dyes are especially preferably used. Though all of acid dyes, direct dyes, basic dyes, reactive dyes and food dyes are useful as the water-soluble dye, it is preferable that the water-soluble dye is properly selected from the viewpoints of solubility in water, color formation properties, fastness, and so on.

Concretely, examples of yellow water-soluble dyes include C.I. Acid Yellow 17, C.I. Acid Yellow 23, C.I. Acid Yellow 42, C.I. Acid Yellow 44, C.I. Acid Yellow 79, C.I. Acid Yellow 142, C.I. Food Yellow 3, C.I. Food Yellow 4, C.I. Direct Yellow 1, C.I. Direct Yellow 12, C.I. Direct Yellow 24, C.I. Direct Yellow 26, C.I. Direct Yellow 33, C.I. Direct Yellow 44, C.I. Direct Yellow 50, C.I. Direct Yellow 86, C.I. Direct Yellow 120, C.I. Direct Yellow 132, C.I. Direct Yellow 142, C.I. Direct Yellow 144, C.I. Direct Orange 26, C.I. Direct Orange 29, C.I. Direct Orange 62, C.I. Direct Orange 102, C.I. Basic Yellow 1, C.I. Basic Yellow 2, C.I. Basic Yellow 11, C.I. Basic Yellow 13, C.I. Basic Yellow 14, C.I. Basic Yellow 15, C.I. Basic Yellow 19, C.I. Basic Yellow 21, C.I. Basic Yellow 23, C.I. Basic Yellow 24, C.I. Basic Yellow 25, C.I. Basic Yellow 28, C.I. Basic Yellow 29, C.I. Basic Yellow 32, C.I. Basic Yellow 36, C.I. Basic Yellow 40, C.I. Basic Yellow 41, C.I. Basic Yellow 45, C.I. Basic Yellow 49, C.I. Basic Yellow 51, C.I. Basic Yellow 53, C.I. Basic Yellow 63, C.I. Basic Yellow 64, C.I. Basic Yellow 65, C.I. Basic Yellow 67, C.I. Basic Yellow 70, C.I. Basic Yellow 73, C.I. Basic Yellow 77, C.I. Basic Yellow 87, C.I. Basic Yellow 91, C.I. Reactive Yellow 1, C.I. Reactive Yellow 5, C.I. Reactive Yellow 11, C.I. Reactive Yellow 13, C.I. Reactive Yellow 14, C.I. Reactive Yellow 20, C.I. Reactive Yellow 21, C.I. Reactive Yellow 22, C.I. Reactive Yellow 25, C.I. Reactive Yellow 40, C.I. Reactive Yellow 47, C.I. Reactive Yellow 51, C.I. Reactive Yellow 55, C.I. Reactive Yellow 65, and C.I. Reactive Yellow 67.

Examples of magenta water-soluble dyes include C.I. Acid Red 1, C.I. Acid Red 8, C.I. Acid Red 13, C.I. Acid Red 14, C.I. Acid Red 18, C.I. Acid Red 26, C.I. Acid Red 27, C.I. Acid Red 35, C.I. Acid Red 37, C.I. Acid Red 42, C.I. Acid Red 52, C.I. Acid Red 82, C.I. Acid Red 87, C.I. Acid Red 89, C.I. Acid Red 92, C.I. Acid Red 97, C.I. Acid Red 106, C.I. Acid Red 111, C.I. Acid Red 114, C.I. Acid Red 115, C.I. Acid Red 134, C.I. Acid Red 186, C.I. Acid Red 249, C.I. Acid Red 254, C.I. Acid Red 289, C.I. Food Red 7, C.I. Food Red 9, C.I. Food Red 14, C.I. Direct Red 1, C.I. Direct Red 4, C.I. Direct Red 9, C.I. Direct Red 13, C.I. Direct Red 17, C.I. Direct Red 20, C.I. Direct Red 28, C.I. Direct Red 31, C.I. Direct Red 39, C.I. Direct Red 80, C.I. Direct Red 81, C.I. Direct Red 83, C.I. Direct Red 89, C.I. Direct Red 225, C.I. Direct Red 227, C.I. Basic Red 2, C.I. Basic Red 12, C.I. Basic Red 13, C.I. Basic Red 14, C.I. Basic Red 15, C.I. Basic Red 18, C.I. Basic Red 22, C.I. Basic Red 23, C.I. Basic Red 24, C.I. Basic Red 27, C.I. Basic Red 29, C.I. Basic Red 35, C.I. Basic Red 36, C.I. Basic Red 38, C.I. Basic Red 39, C.I. Basic Red 46, C.I. Basic Red 49, C.I. Basic Red 51, C.I. Basic Red 52, C.I. Basic Red 54, C.I. Basic Red 59, C.I. Basic Red 68, C.I. Basic Red 69, C.I. Basic Red 70, C.I. Basic Red 73, C.I. Basic Red 78, C.I. Basic Red 82, C.I. Basic Red 102, C.I. Basic Red 104, C.I. Basic Red 109, C.I. Basic Red 112, C.I. Reactive Red 1, C.I. Reactive Red 14, C.I. Reactive Red 17, C.I. Reactive Red 25, C.I. Reactive Red 26, C.I. Reactive Red 32, C.I. Reactive Red 37, C.I. Reactive Red 44, C.I. Reactive Red 46, C.I. Reactive Red 55, C.I. Reactive Red 60, C.I. Reactive Red 66, C.I. Reactive Red 74, C.I. Reactive Red 79, C.I. Reactive Red 96, and C.I. Reactive Red 97.

Examples of cyan water-soluble dyes include C.I. Acid Blue 9, C.I. Acid Blue 29, C.I. Acid Blue 45, C.I. Acid Blue 92, C.I. Acid Blue 249, C.I. Direct Blue 1, C.I. Direct Blue 2, C.I. Direct Blue 6, C.I. Direct Blue 15, C.I. Direct Blue 22, C.I. Direct Blue 25, C.I. Direct Blue 71, C.I. Direct Blue 76, C.I. Direct Blue 79, C.I. Direct Blue 86, C.I. Direct Blue 87, C.I. Direct Blue 90, C.I. Direct Blue 98, C.I. Direct Blue 163, C.I. Direct Blue 165, C.I. Direct Blue 199, C.I. Direct Blue 202, C.I. Basic Blue 1, C.I. Basic Blue 3, C.I. Basic Blue 5, C.I. Basic Blue 7, C.I. Basic Blue 9, C.I. Basic Blue 21, C.I. Basic Blue 22, C.I. Basic Blue 26, C.I. Basic Blue 35, C.I. Basic Blue 41, C.I. Basic Blue 45, C.I. Basic Blue 47, C.I. Basic Blue 54, C.I. Basic Blue 62, C.I. Basic Blue 65, C.I. Basic Blue 66, C.I. Basic Blue 67, C.I. Basic Blue 69, C.I. Basic Blue 75, C.I. Basic Blue 77, C.I. Basic Blue 78, C.I. Basic Blue 89, C.I. Basic Blue 92, C.I. Basic Blue 93, C.I. Basic Blue 105, C.I. Basic Blue 117, C.I. Basic Blue 120, C.I. Basic Blue 122, C.I. Basic Blue 124, C.I. Basic Blue 129, C.I. Basic Blue 137, C.I. Basic Blue 141, C.I. Basic Blue 147, C.I. Basic Blue 155, C.I. Reactive Blue 1, C.I. Reactive Blue 2, C.I. Reactive Blue 7, C.I. Reactive Blue 14, C.I. Reactive Blue 15, C.I. Reactive Blue 23, C.I. Reactive Blue 32, C.I. Reactive Blue 35, C.I. Reactive Blue 38, C.I. Reactive Blue 41, C.I. Reactive Blue 63, C.I. Reactive Blue 80, and C.I. Reactive Blue 95.

Examples of black water-soluble dyes include C.I. Acid Black 1, C.I. Acid Black 2, C.I. Acid Black 7, C.I. Acid Black 24, C.I. Acid Black 26, C.I. Acid Black 94, C.I. Food Black 1, C.I. Food Black 2, C.I. Direct Black 19, C.I. Direct Black 22, C.I. Direct Black 32, C.I. Direct Black 38, C.I. Direct Black 51, C.I. Direct Black 56, C.I. Direct Black 71, C.I. Direct Black 74, C.I. Direct Black 75, C.I. Direct Black 77, C.I. Direct Black 154, C.I. Direct Black 168, C.I. Direct Black 171, C.I. Basic Black 2, C.I. Basic Black 8, C.I. Reactive Black 3, C.I. Reactive Black 4, C.I. Reactive Black 7, C.I. Reactive Black 11, C.I. Reactive Black 12, and C.I. Reactive Black 17.

The content of the coloring matter is preferably in the range of from 1% by weight to 10% by weight, and more preferably in the range of from 3% by weight to 5% by weight based on the total weight of the ink. This content of the coloring matter is determined while taking into consideration the viscosity, dryness, discharge stability and color formation properties of the ink and the storage stability of a printed material and so on.

Water is principally used as the solvent. For the purposes of imparting desired physical properties to the ink, improving the solubility or dispersibility of the coloring matter in water and preventing drying of the ink and others, organic solvents which are known in the art can be used.

Concretely, examples of organic solvents include polyhydric alcohols such as ethylene glycol, diethylene glycol, triethylene glycol, and polyethylene glycol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; polyhydric alcohol aryl ethers such as ethylene glycol monophenyl ether and ethylene glycol monobenzyl ether; nitrogen-containing heterocyclic compounds such as N-methyl-2-pyrrolidone, N-hydroxyethyl-pyrrolidone, 1,3-dimethyl imidazolidinone, ε-caprolactam, and γ-butyrolactone; amides such as formamide, N-methylformamide, and N,N-dimethylformamide; amines such as monoethanolamine, diethanolamine, triethanolamine, monoethylamine, diethylamine, and triethylamine; and sulfur-containing compounds such as dimethyl sulfoxide and sulforane.

The content of the organic solvent is preferably in the range of from 5% by weight to 50% by weight, and more preferably in the range of from 10% by weight to 35% by weight based on the total weight of the ink. The content of the organic solvent is determined while taking into consideration the viscosity, dryness and discharge stability of the ink and so on.

The specified cyclic aliphatic compound contained in the ink is a compound represented by the following chemical formula (1), which is capable of suppressing bubbling of the ink.

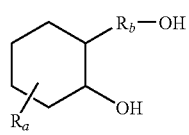

(1)

Here, Ra and Rb each represents an alkyl group of from 1 to 3 carbon atoms and are satisfied with the relation of [2≦(Ra+Rb)≦4].

Concretely, examples of the cyclic aliphatic compound which can be used include
4-methyl-2-(1-hydroxymethyl)cyclohexanol,
5-methyl-2-(1-hydroxymethyl)cyclohexanol,
3-methyl-2-(1-hydroxymethyl)cyclohexanol,
6-methyl-2-(1-hydroxymethyl)cyclohexanol,
4-ethyl-2-(1-hydroxymethyl)cyclohexanol,
5-ethyl-2-(1-hydroxymethyl)cyclohexanol,
3-ethyl-2-(1-hydroxymethyl)cyclohexanol,
6-ethyl-2-(1-hydroxymethyl)cyclohexanol,
4-propyl-2-(1-hydroxymethyl)cyclohexanol,
5-propyl-2-(1-hydroxymethyl)cyclohexanol,
3-propyl-2-(1-hydroxymethyl)cyclohexanol,
6-propyl-2-(1-hydroxymethyl)cyclohexanol,
4-methyl-2-(1-hydroxyethyl)cyclohexanol,
5-methyl-2-(1-hydroxyethyl)cyclohexanol,
3-methyl-2-(1-hydroxyethyl)cyclohexanol,
6-methyl-2-(1-hydroxyethyl)cyclohexanol,
4-ethyl-2-(1-hydroxyethyl)cyclohexanol,
5-ethyl-2-(1-hydroxyethyl)cyclohexanol,
3-ethyl-2-(1-hydroxyethyl)cyclohexanol,
6-ethyl-2-(1-hydroxyethyl)cyclohexanol,
4-methyl-2-(1-hydroxypropyl)cyclohexanol,
5-methyl-2-(1-hydroxypropyl)cyclohexanol,
3-methyl-2-(1-hydroxypropyl)cyclohexanol, and
6-methyl-2-(1-hydroxypropyl)cyclohexanol.

In the ink, of the foregoing various cyclic aliphatic compounds, compounds represented by the following chemical formulae (2) to (4) are especially preferable because they are excellent in solubility in water and an ability to reduce a surface tension, are easy for the ink preparation and are able to more suppress the generation of a fine bubble.

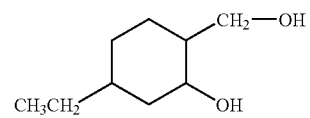

(2)

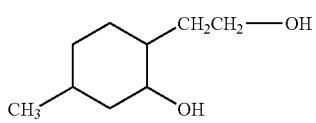

(3)

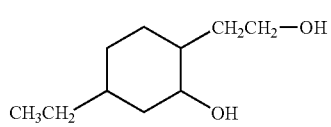

(4)

The cyclic aliphatic compound can suppress bubbling of the ink. Thus, in the ink, even when the temperature of the ink is increased due to a pressure producing element of an ink discharge head 23 installed in the printer device 1 as described later, the cyclic aliphatic compound is able to prevent the formation of a bubble caused due to a phenomenon that a gas which has not been completely dissolved in the ink is generated. The cyclic aliphatic compound is also able to prevent the generation of a fine air bubble caused due to the up-and-down movement of a valve mechanism 34 of the ink discharge head 23 as described later. In particular, the cyclic aliphatic compounds represented by the chemical formulae (2) to (4) are able to more likely suppress the formation of a fine bubble than other cyclic aliphatic compounds.

The cyclic aliphatic compound improves the wettability of the ink against a surface inside the ink discharge head 23 as described later. Since the ink is excellent in wettability against the ink discharge head 23, even when a fine bubble is formed, this fine bubble does not remain on the surface inside the ink discharge head 23; and even in the case where a fine bubble is formed in the vicinity of a nozzle 62*a*, the matter that the bubble remains in the vicinity of the nozzle 62*a* or inside the nozzle 62*a* can be prevented from occurring. In particular, the cyclic aliphatic compounds represented by the chemical formulae (2) to (4) are excellent in an ability to reduce a surface tension and are able to more likely prevent the matter that the bubble remains in the vicinity of the nozzle 62*a* or inside the nozzle 62*a* from occurring.

From these matters, when the ink contains the cyclic aliphatic compound represented by the chemical formula (1), the discharge stability becomes good without causing faults caused due to a fine bubble such as non-discharge and deficient discharge, and blurring or deletion on images or letters can be prevented from occurring.

The cyclic aliphatic compound also improves the wettability of the ink against a sizing agent which is usually used in plain paper, such as surface sizing agents, for example, various styrene/acrylic copolymers and olefin based resins and internal sizing agents, for example, alkyl ketene dimer (AKD) based sizing agents and alkenyl succinic anhydride (ASA) based sizing agents. Thus, the cyclic aliphatic compound is high in optical density of images or letters and is able to prevent bleeding of boundaries and unevenness of mixed color from occurring on plain paper such as copying papers in addition to dedicated papers for inkjet recording which are exclusively used for inkjet printer devices. Accordingly, when the ink contains the cyclic aliphatic compound, high-grade images or letters which are free from blurring or deletion or the like and high in optical density and are free from bleeding of boundaries and unevenness of mixed color can be formed.

The content of such a cyclic aliphatic compound is preferably in the range of from 0.1% by weight to 5% by weight, and more preferably in the range of from 0.2% by weight to 3% by weight based on the total weight of the ink. When the content of the cyclic aliphatic compound is less than 0.1% by weight, the formation of a bubble in the ink cannot be suppressed, non-discharge or deficient discharge is caused and blurring or deletion is generated, whereby the quality of images or letters is deteriorated. On the other hand, when the content of the cyclic aliphatic compound exceeds 5% by weight, the viscosity of the ink increases, and the discharge stability is deteriorated. Accordingly, by making the content of the cyclic aliphatic compound fall within the range of from 0.1% by weight to 5% by weight based on the total weight of the ink, the discharge stability of the ink becomes good, and high-grade images which are free from blurring or deletion or the like can be formed. The content of the cyclic aliphatic compound is determined while taking into consideration the viscosity, dryness, discharge stability and color formation properties of the ink and the storage stability of a printed material and so on.

For the purpose of improving the wettability of the recording paper P against various sizing agents, the ink may further contain, in addition to the foregoing cyclic aliphatic compound, an ethylene oxide adduct of a branched alkyl diol represented by the following chemical formula (5) as a surfactant.

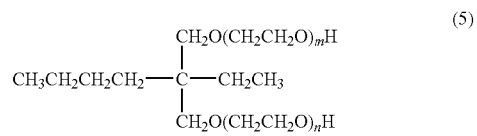

(5)

Here, m and n each represents an integer of from 0 to 10 and are satisfied with the relation of [1≦(m+n)≦10]. When (m+n) is less than 1, the resulting compound is not substantially soluble in water and is difficult for use. On the other hand, when (m+n) exceeds 10, the resulting compound is excessively high in hydrophilicity and deteriorated in a surface activation ability. Thus, the wettability against various sizing agents in the recording paper P, such as surface sizing agents and internal sizing agents, is deteriorated.

This ethylene oxide adduct of a branched alkyl diol can improve the wettability of the ink against the recording paper P. When the ink contains the ethylene oxide adduct of a branched alkyl diol, the wettability against various sizing agents in the recording paper P, such as surface sizing agents and internal sizing agents, becomes higher coupled with the effect of the foregoing cyclic aliphatic compound. Thus, high-grade images or letters which are further improved in the generation of blurring of boundaries and unevenness of mixed color can be printed even on plain paper in addition to dedicated papers for inkjetting.

When the ink contains the ethylene oxide adduct of a branched alkyl diol represented by the chemical formula (5) together with the cyclic aliphatic compound represented by any one of the chemical formulae (2) to (4), the wettability against various sizing agents in the recording paper P, such as surface sizing agents and internal sizing agents, becomes high much more, bleeding of boundaries and unevenness of mixed color are prevented from occurring, and higher-quality images or letters can be printed.

The ink may contain, in addition to the ethylene oxide adduct of a branched alkyl diol represented by the chemical formula (5), other surfactant as described blow as the surfactant. Examples of other surfactant include special phenol type nonionic surfactants such as polycyclic phenol ethoxylate; ester type nonionic surfactants such as ethylene oxide adducts of glyceride, polyethylene glycol oleate, polyoxyalkylene taloate, sorbitan lauryl ester, sorbitan oleyl ester, and polyoxyethylene sorbitan oleyl ester; amide type nonionic surfactants such as coconut oil fatty acid diethanol amide and polyoxyethylene coconut oil fatty acid monoethanol amide; anionic surfactants such as acetylene glycol and ethylene oxide adducts thereof, alcohol sulfate sodium salts, higher alcohol sulfate sodium salts, polyoxyethylene alkylphenyl ether sulfuric acid ester ammonium salts, and sodium alkylbenzenesulfonates; cationic surfactants such as mono-long chain alkyl cations, di-long chain alkyl cations, and alkylamine oxides; and amphoteric surfactants such as laurylamidopropyl acetic acid betaine and laurylaminoacetic acid betaine. These surfactants which are known in the art may be used singly or in admixture.

The content of the surfactant is preferably in the range of from 0.1% by weight 5% by weight, and more preferably in the range of from 0.2% by weight to 1% by weight based on the total weight of the ink. It is preferable that the surfactant is contained such that a static surface tension of the ink is from 30 to 45 mN/m (at 25° C.).

In addition to the coloring matter, solvent, cyclic aliphatic compound and surfactant, for example, a pH adjuster, a chelating reagent, an antiseptic, an antirust agent, and so on which are known in the art may be added in the ink.

Examples of the pH adjuster include amines such as diethanolamine and triethanolamine; hydroxides of an alkali metal element such as lithium hydroxide, sodium hydroxide and potassium hydroxide; ammonium hydroxide; quaternary ammonium hydroxides; quaternary phosphonium hydroxides; and carbonates of an alkali metal such as lithium carbonate, sodium carbonate, and potassium carbonate. These compounds can be used singly or in admixture.

Examples of the chelating reagent include sodium ethylenediaminetetraacetate, sodium nitrilotriacetate, sodium hydroxyethylethylenediaminetriacetate, sodium diethylenetriaminepentaacetate, and sodium uramil diacetate. These compounds can be used singly or in admixture.

Examples of the antiseptic include sodium dehydroacetate, sodium sorbate, sodium 2-pyridinethiol-1-oxide, sodium benzoate, and sodium pentachlorophenol. These compounds can be used singly or in admixture.

Examples of the antirust agent include acidic sulfurous acid salts, sodium thiosulfate, antimony thiodiglycolate, diisopropylammonium nitrite, pentaerythritol tetranitrate, and dicyclohexylammonium nitrite. These compounds can be used singly or in admixture.

In addition to the foregoing surfactant and the like, an ultraviolet ray absorber described in, for example, JP-A-9-227811 may be properly added in the ink.

With respect to general characteristics of the ink having the foregoing constitution, the viscosity is from 0.5 to 5 cP (at 25° C.) ; the static surface tension is from 30 to 45 mN/m (at 25° C.) ; and the pH is from 6 to 10 (at 25° C.).

In the case of preparing an ink, the ink can be prepared by mixing the coloring matter, the solvent, the foregoing cyclic aliphatic compound, and the surfactant and the pH adjuster and so on which are known in the art in a prescribed mixing ratio and stirring and dispersing the mixture by a screw or the like at the ordinary temperature or while heating at approximately 40° C. to 80° C.

In the ink having the foregoing constitution, by containing the cyclic aliphatic compound represented by the chemical formula (1), bubbling of a fine bubble of the ink is prevented from occurring, and the wettability against the inside of the ink discharge head 23 as described later becomes good. Thus, clogging of the nozzle 62a due to the bubble is prevented from occurring, and the ink is stably discharged in a prescribed direction.

By using, as the cyclic aliphatic compound, the cyclic aliphatic compound represented by any one of the chemical formulae (2) to (4) in the ink, since this cyclic aliphatic compound is excellent in solubility in water and an ability to reduce a surface tension, the formation of a fine bubble can be suppressed much more.

By containing the cyclic aliphatic compound in the ink, the wettability against various sizing agents of the recording paper P, such as surface sizing agents and internal sizing agents, becomes high. Thus, high-grade images or letters which are high in optical density and in which bleeding of boundaries and unevenness of mixed color are prevented from occurring can be formed.

By containing the surfactant represented by the chemical formula (5) together with the cyclic aliphatic compound represented by any one of the chemical formulae (1) to (4) in the ink, the wettability against various sizing agents of the recording paper P becomes high much more. Thus, high-grade images or letters which are high in optical density and in which bleeding of boundaries and unevenness of mixed color are prevented from occurring can be formed.

Next, the printer device 1 using this ink will be described. As illustrated in FIG. 1, the printer device 1 is provided with an inkjet printer head cartridge (hereinafter referred to as "head cartridge") 2 for discharging the foregoing ink onto an object, for example, the recording paper P and a device main body 3 in which this head cartridge 2 is installed. This printer device 1 is a so-called line type printer device in which nozzles are arranged in parallel in one or more lines in a substantial line state in a width direction of the recording paper P, namely an arrow W direction in FIG. 1. In the printer device 1, the head cartridge 2 is detachable against the device main body 3, and an ink cartridge 11 which becomes a liquid cartridge having an ink accommodated therein is detachable against the head cartridge 2. This printer device 1 is provided with a yellow ink cartridge 11y, a magenta ink cartridge 11m, a cyan ink cartridge 11c and a black ink cartridge 11k. Incidentally, this ink cartridge 11 is not limited to the manner that it is mounted detachably against the head cartridge 2 but may be integrally formed with the head cartridge 2.

Figure 2:
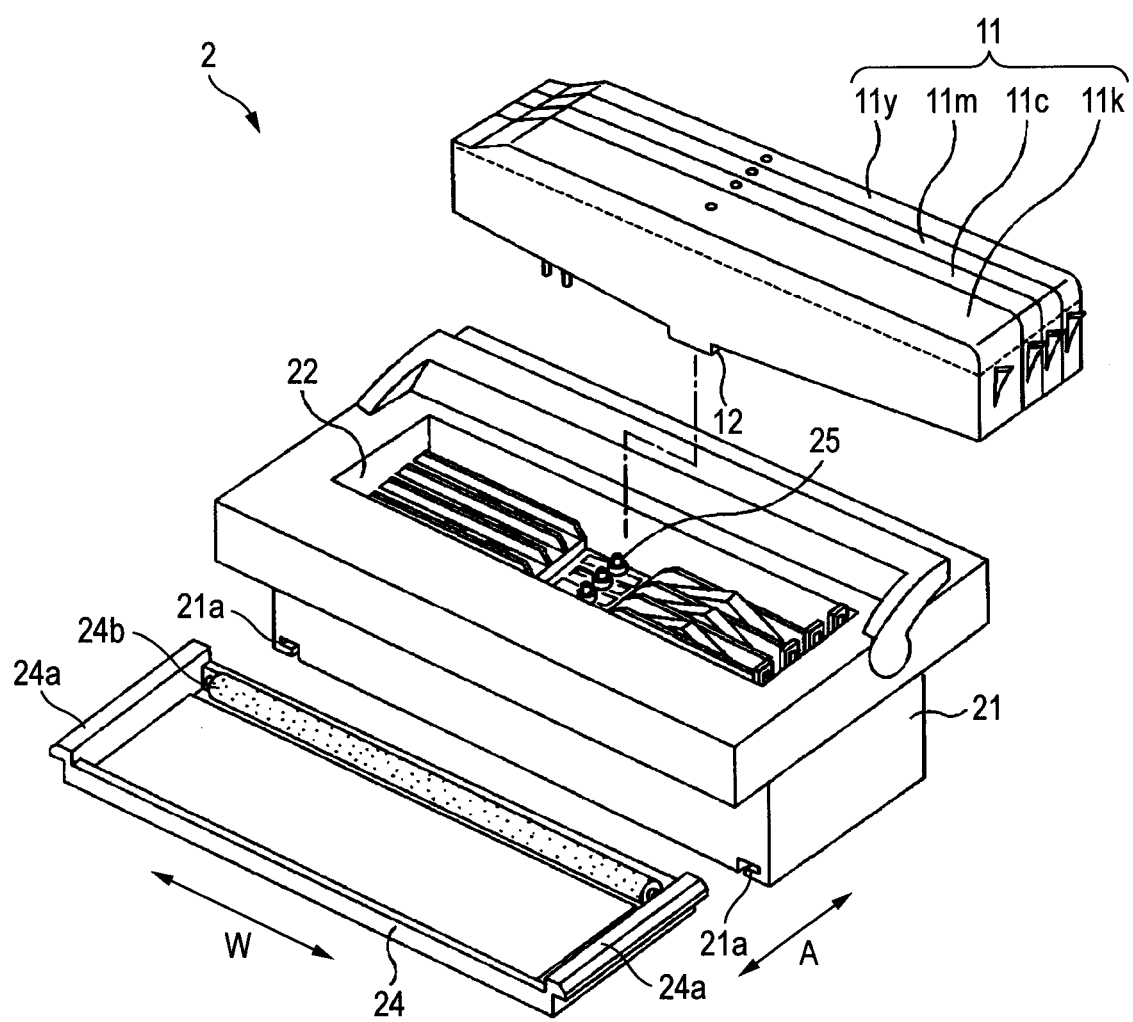
FIG. 2 is an oblique view to show a head cartridge of this printer device.
Figure 3:
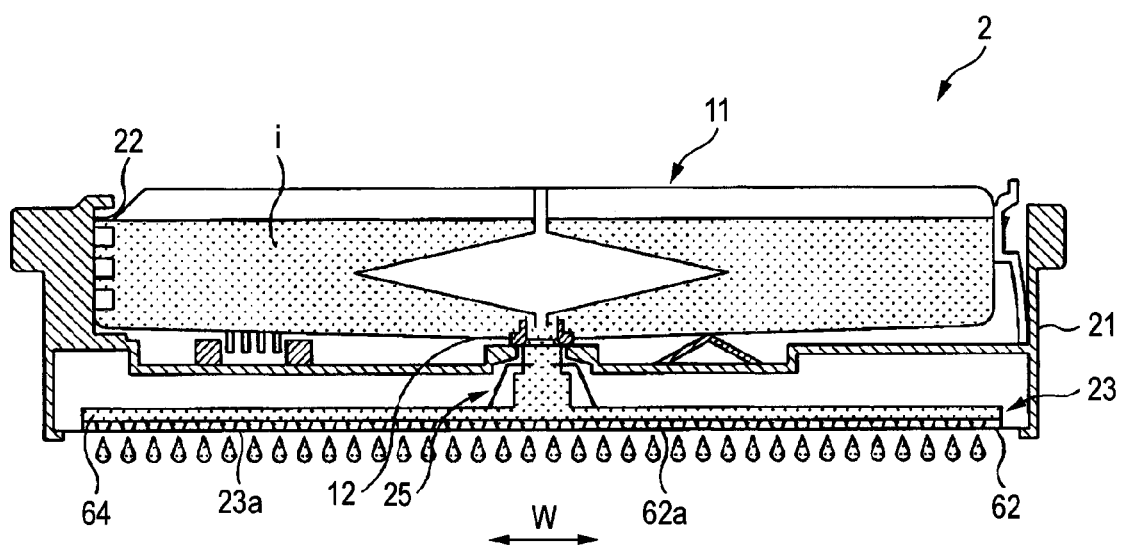
FIG. 3 is a sectional view to show this head cartridge.

The ink cartridge 11 is installed in the head cartridge 2 for discharging an ink and feeds an ink accommodated in the head cartridge 2. The ink cartridge 11 is formed in a substantially rectangular shape having a dimension substantially the same as that in the width direction of the recording paper P. As illustrated in FIGS. 2 and 3, the ink cartridge 11 is provided with an ink feed part 12 for feeding an ink into the head cartridge 2.

The ink feed part 12 is provided in a substantially central part in the lower side. This ink feed part 12 is a nozzle having a substantially projected shape; and a tip of this nozzle is fitted in a connection part 25 of the head cartridge 2 as described later, from which an ink can be fed into the head cartridge 2. The ink feed part 12 is provided with a valve mechanism therein, and the feed of an ink into a cartridge main body 21 is adjusted by this valve mechanism.

The head cartridge 2 installed in this ink cartridge 11 finely divides and discharges the foregoing ink by a pressure generated by a pressure producing measure, for example, an electro-thermo conversion type and an electromechanical conversion type, whereby the ink formed in a droplet state is discharged onto a principal face of an object such as the recording paper P. Concretely, as illustrated in FIGS. 2 and 3, the head cartridge 2 has the cartridge main body 21. The cartridge main body 21 is provided with an installation part 22 in which the ink cartridge 11 is installed, the ink discharge head 23 which becomes a liquid discharge head for discharging an ink, and a head cap 24 for protecting this ink discharge head 23.

As illustrated in FIG. 2, the installation part 22 is provided with the connection part 25 which is connected to each ink feed part 12 corresponding to the ink feed part 12 of the respective ink cartridges 11y, 11m, 11c and 11k in a substantial center of the bottom face thereof. This connection part 25 is fed with an ink from the ink feed part 12 of the ink cartridge 11 and becomes an ink feed passage for feeding an ink into the ink discharge head 23 for discharging an ink as provided on the bottom face of the cartridge main body 21.

Figure 4:
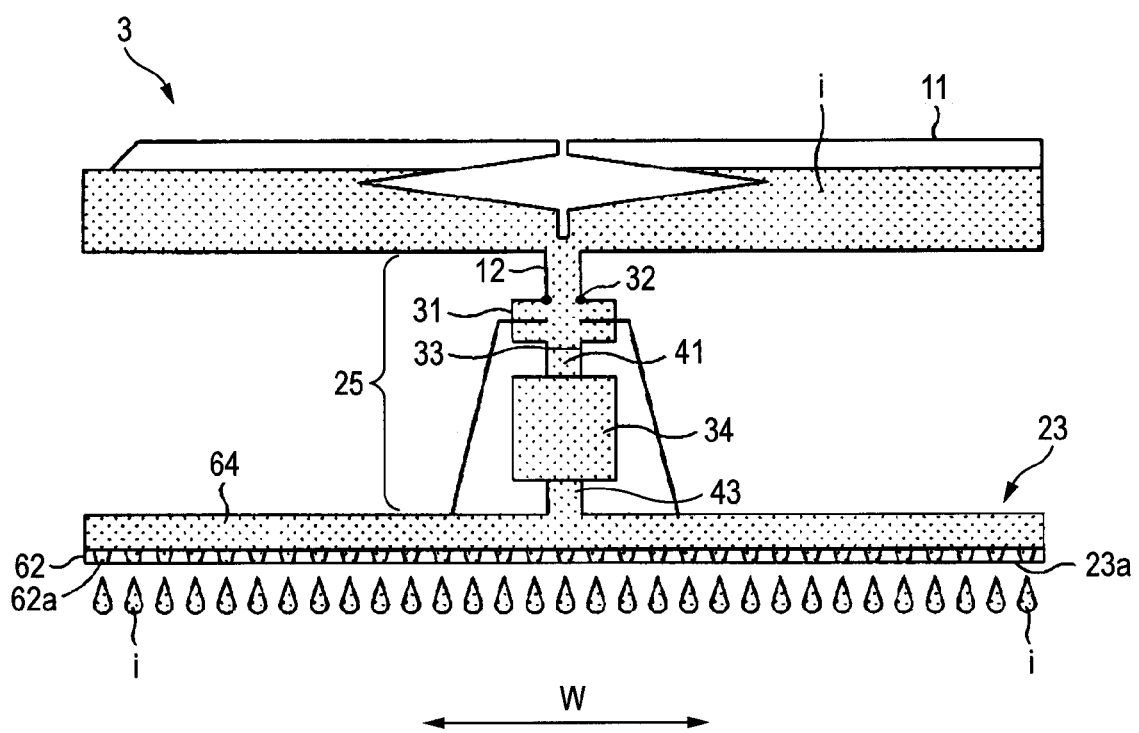
FIG. 4 is a schematic view to show a connection part of this head cartridge.

Concretely, as illustrated in FIG. 4, the connection part 25 has an ink storage part 31 for storing an ink fed from the ink cartridge 11, a seal member 32 for sealing the ink connection part 12 communicated with the connection part 25, a filter 33 for removing impurities in the ink, and the valve mechanism 34 for adjusting the feed of an ink into a side of the ink discharge head 23.

The ink storage part 31 is connected to the ink feed part 12 and is a space part for once storing an ink fed from the ink cartridge 11. The seal member 32 is provided between the ink storage part 31 and the ink feed part 12 and seals a connection portion between the ink feed part 12 and the ink storage part 31 of the ink cartridge 11 such that the ink does leak from the connection portion between the ink feed part 12 and the ink storage part 31. The filter 33 removes dusts in the ink flowing from the ink storage part 31 into the valve mechanism 34 and is provided between the ink storage part 31 and the valve mechanism 34.

Figure 5A:
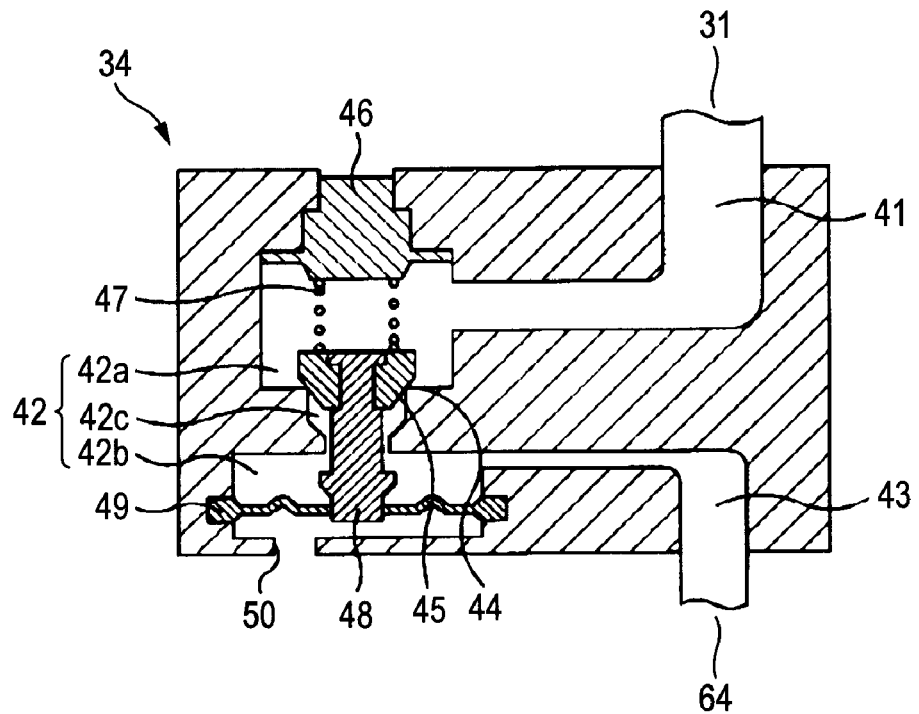
Figure 5B:
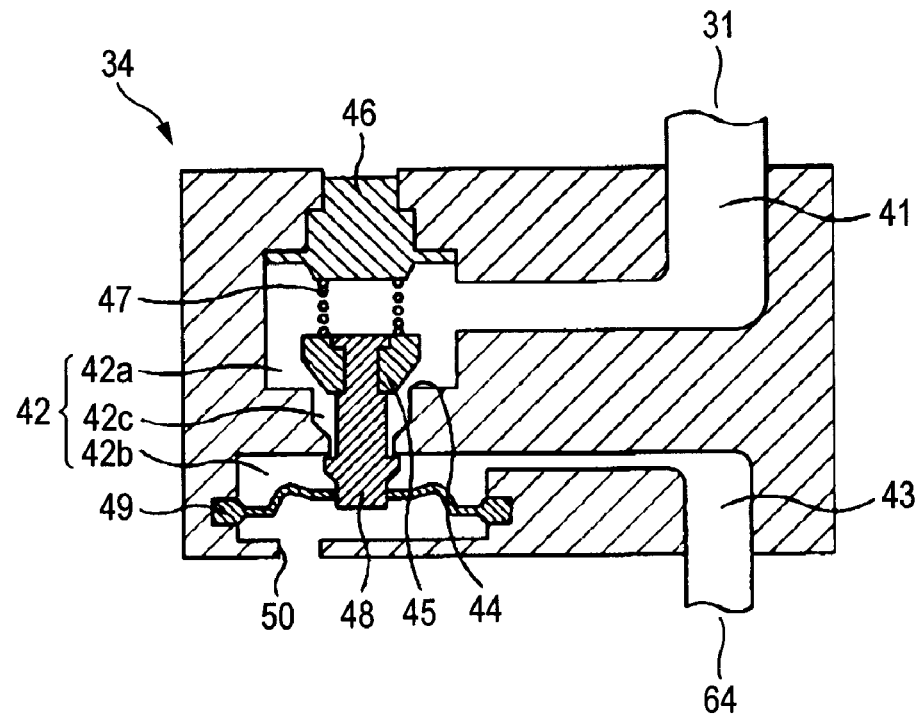

As illustrated in FIGS. 5A and 5B, the valve mechanism 34 is configured to have an ink inflow passage 41 connected to the ink storage part 31, an ink compartment 42 into which an ink flows from the ink inflow passage 41, and an ink outflow passage 43 for flowing out an ink from the ink compartment 42.

The ink inflow passage 41, one end of which is connected to the ink storage part 31, with the other end being connected to the ink compartment 42, is a feed passage for feeding an ink from the ink storage part 31 into the ink compartment 42. The ink compartment 42 is provided between the ink inflow passage 41 and the ink outflow passage 43 and adjusts the feed of an ink from the ink inflow passage 41 into the ink outflow passage 43. The ink outflow passage 43, one end of which is connected to the ink compartment 42, with the other end being connected to the ink discharge head 23, is a feed passage for feeding an ink from the ink compartment 42 into the ink discharge head 23.

The valve mechanism 34 flows an ink fed from the ink cartridge 11 into the ink compartment 42 from the ink inflow passage 41, flows out the ink from the ink compartment 42 into the ink outflow passage 43 and feeds the ink into the ink discharge head 23. In the ink compartment 42 for adjusting the feed of an ink, an upper part 42a thereof is connected to the ink inflow passage 41; a lower part 42b thereof is connected to the ink outflow passage 43; and a central part 42c thereof adjusts an ink to be fed from the ink inflow passage 41 into the ink outflow passage 43. In the central part 42c, a valve 45 is provided in an opening 44 connected to the upper part 42a. In the ink compartment 42, this valve 45 adjusts the feed of an ink from the ink inflow passage 41 into the ink outflow passage 43.

As illustrated in FIGS. 5A and 5B, the valve 45 for adjusting the feed of an ink moves up and down due to an energizing force of an energizing member 47 mounted in a negative pressure adjusting screw 46 provided on a top face of the upper part 42a of the ink compartment 42, a restoring force of a diaphragm 49 via valve shaft 48 provided in the lower part 42b of the ink compartment 42, a negative pressure of the ink in a side of the ink outflow passage 43. When the valve 45 is positioned in a side of the lower part 42b of the ink compartment 42, it closes the opening 44, thereby intercepting the feed of an ink for the ink outflow passage 43 from the ink compartment 42. On the other hand, when the valve 45 is positioned in the upper part 42a of the ink compartment 42 opposing to the energizing force of the energizing member 47, it opens the opening 44, thereby enabling it to feed an ink into the ink outflow passage 43.

The negative pressure adjusting screw 46 is a screw for adjusting the energizing force of the energizing member 47. Thus, the negative pressure adjusting screw 46 is able to adjust a negative pressure of the ink for operating the valve 45 for opening and closing the opening 44.

The energizing member 47, the energizing force of which is adjusted by the negative pressure adjusting screw 46, connects the valve 45 to the negative pressure adjusting screw 46 between a top face of the valve 45 and a top face of the ink compartment 42 by, for example, a compression coil spring and energizes the valve 45 towards the side of the lower part 42b, namely in a direction to close the opening 44 by an energizing force towards the side of the lower part 42b of the ink compartment 42.

The valve shaft 48 provided in the valve 45, one end of which is connected to the valve 45, with the other end being connected to the diaphragm 49 mounted in the lower part 42b of the ink compartment 42, is a shaft which is provided such that the valve 45 operates together with the movement of the diaphragm 49.

In the diaphragm 49 for operating the valve 45, the both ends thereof are fixed to the lower part 42b of the ink compartment 42, and the center thereof is connected to the valve shaft 48. This diaphragm 49 is a thin elastic plate. In this diaphragm 49, the face in an opposite side to the face of the side of the opening 44 is opposed to an air hole 50 provided in the lower part 42b of the ink compartment 42 and is brought into contact with the air. For that reason, in the diaphragm 49, an ink is discharged from the ink discharge head 23, and when the pressure in the ink outflow passage 43 is reduced, the diaphragm 49 is pushed up by the air which has entered from the air hole 50.

In the valve mechanism 34 having the foregoing configuration, when an ink is not discharged, as illustrated in FIG. 5A, the valve 45 is pushed down towards the side of the lower part 42b due to an energizing force of the energizing member 47 towards the side of the lower part 42b, thereby closing the opening 44 of the ink compartment 42. Thus, in the ink compartment 42, the ink does not flow into the lower part 42b from the upper part 42a, and the feed of the ink from the ink inflow passage 41 into the ink outflow passage 43 is intercepted.

In the valve mechanism 34, during discharging an ink from the ink discharge head 23, a negative pressure of the ink in the lower part 42b of the ink compartment 42 increases; and as illustrated in FIG. 5B, the diaphragm 49 is pushed up due to an atmospheric pressure which has entered from the air hole 50 by the negative pressure of the ink, and the valve 45 is pushed up together with the valve shaft 48 opposing to the energizing force of the energizing member 47. Thus, the valve 45 moves towards the side of the upper part 42a of the ink compartment 42; the opening 44 is opened; and the ink fed from the ink cartridge 11 into ink inflow passage 41 is fed into the flow outflow passage 43 from the ink inflow passage 41 via the opening 44. Then, when the ink outflow passage 43 is filled with the ink and the pressure of the lower part 42b of the ink compartment 42 is returned, the diaphragm 49 is returned into an original shape due to its restoring force, and the valve 45 is pulled down towards the side of the lower part 42b together with the valve shaft 48, thereby closing the opening 44. In the light of the above, in the valve mechanism 34, when negative pressure of the ink increases every time of discharging an ink, the valve 45 repeats the foregoing operations, thereby adjusting the feed of an ink from the ink inflow passage 41 into the ink outflow passage 43.

As illustrated in FIG. 3, the ink discharge head 23 for discharging an ink fed from the connection part 25 is arranged along the bottom face of the cartridge main body 21, and nozzles 62a as described later which are an ink discharge nozzle for discharging an ink fed from the connection part 25 are arranged in a substantial line state for every color in a width direction of the recording paper P, namely an arrow W direction in FIG. 3.

Figure 6A:
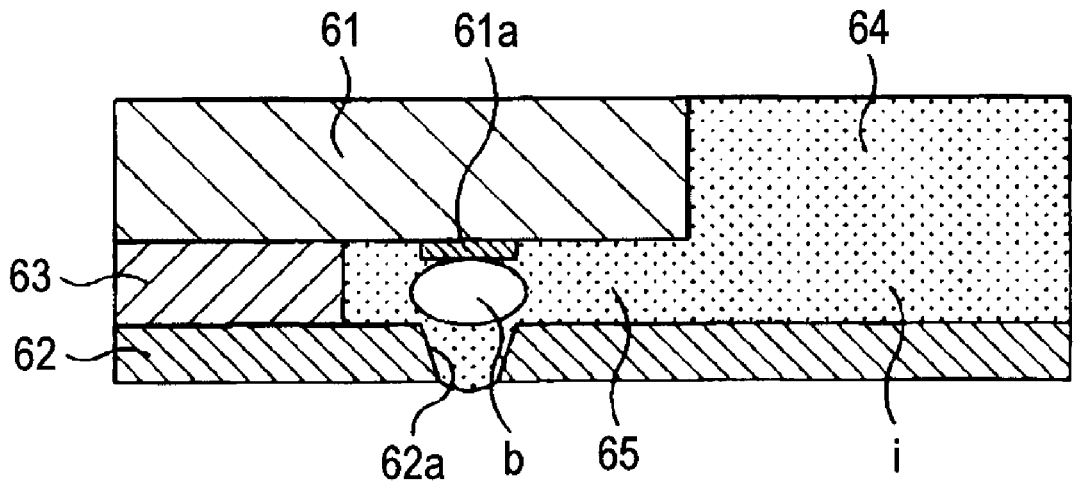
Figure 6B:
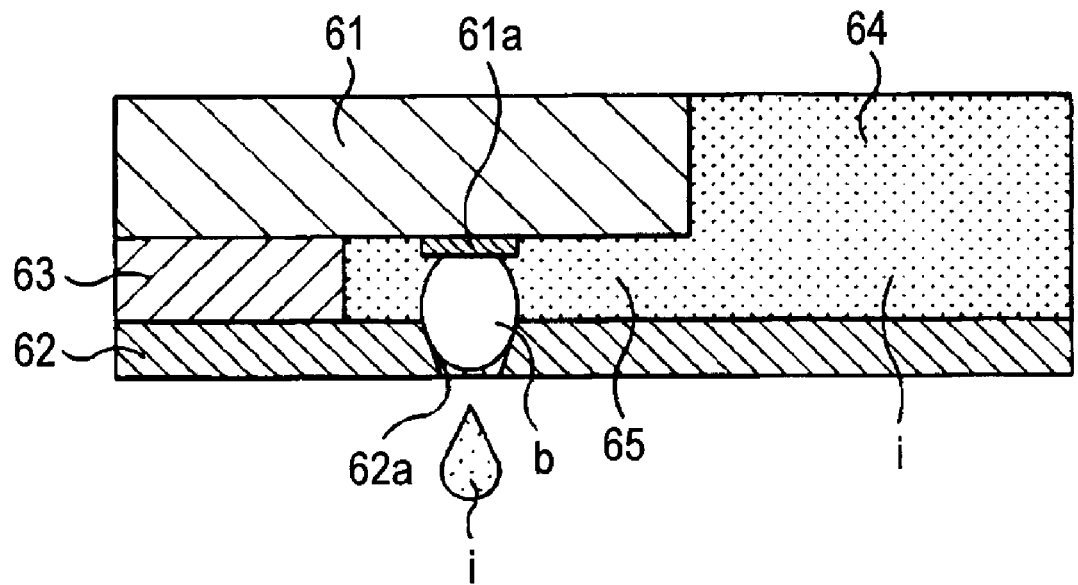

In the ink discharge head 23, a circuit board 61 provided with a heating resistor 61a of en electro-thermal conversion type and nozzles 62a are formed. As illustrated in FIGS. 6A and 6B, an ink passage 64 for feeding an ink fed from the connection part 25 into each nozzle 62a is formed by a nozzle sheet 62 formed of a metal thin film such as nickel plating and a film 63 provided between the circuit board 62 and the nozzle sheet 62. This ink passage 64 is formed long in a direction at which the nozzles 62a are arranged in parallel, namely in the arrow W direction in FIG. 3. Thus, in the ink discharge head 23, the ink flows into the ink passage 64 from the ink cartridge 11 via the connection part 25 and is fed into each nozzle 62a from the ink passage 64.

In the ink discharge head 23, an ink liquid compartment 65 which is surrounded by the circuit board 61, the nozzle sheet 62 and the film 63 and in which the heating resistor 61a pressurizes the ink is formed. In the ink discharge head 23, from approximately 100 to 5,000 ink liquid compartments 65 provided with the heating resistor 61a are provided over a width direction of the recording paper P. Incidentally, in the ink discharge head 23, plural heating resistors 61a may be provided in one ink liquid compartment 65.

The ink discharge head 23 having the foregoing configuration feeds a pulse current into the heating resistor 61a on a basis of printing data for a period of time of, for example, from approximately 1 to 3 microseconds. Thus, in the ink discharge head 23, the heating resistor 61a is driven and rapidly heated. In the ink discharge head 23, when the heating resistor 61a is heated, as illustrated in FIG. 6A, an air bubble b is formed in an ink coming into contact with the heating resistor 61a. Then, in the ink discharge head 23, as illustrated in FIG. 6B, the air bubble b pressurizes the ink while expanding, and the ink thus pushed away becomes in a droplet state and is discharged from the nozzle 62a. After discharging the ink droplet, the ink discharge head 23 is again returned to an original state before discharging by feeding an ink into the ink liquid compartment 65 through the ink passage 64. The ink discharge head 23 repeats the foregoing operations on a basis of printing data and discharges the ink in a droplet state onto the recording paper P.

In the ink discharge head 23, since plural heating resistors 61a are provided over a width direction of the recording paper P, heating places of the ink are increased in proportion, and the temperature of the ink is liable to increase. In the ink discharge head 23, at least one cyclic aliphatic compound represented by the chemical formula (1) is contained in the ink as described previously. Thus, even when the temperature of the ink increases, the formation of a fine bubble within the ink liquid compartment 65 or the nozzle 62a is prevented from occurring. Of the cyclic aliphatic compounds, by using the cyclic aliphatic compound represented by any one of the chemical formulae (2) to (4) in the ink, the formation of a fine bubble can be suppressed much more because this cyclic aliphatic compound is excellent in solubility in water and an ability to reduce a surface tension. In the ink discharge head 23, since at least one cyclic aliphatic compound is contained in the ink, the wettability of the ink against an inner wall of the ink liquid compartment 65 or an inner wall of the nozzle 62a is enhanced, and even when a fine bubble is formed, the fine bubble does not remain within the ink liquid compartment 65 or the nozzle 62a. In the ink discharge head 23, since not only the wettability of the ink against an inner wall of the ink liquid compartment 65 or an inner wall of the nozzle 62a is enhanced, but also the formation of a fine bubble within the ink liquid compartment 65 or the nozzle 62a is prevented from occurring, deficient discharge such as non-discharge of the ink due to a fine bubble and bending of a discharge direction can be prevented, and the discharge stability is good.

As illustrated in FIG. 2, a head cap 24 provided in a side of a discharge face 23a of the ink discharge head 23 of the cartridge main body 21 is a cap provided for the purpose of protecting the ink discharge head 23 and is evacuated from the ink discharge head 23 at the time of printing operation. The head cap 24 is provided with one pair of engagement projections 24a provided in the both ends thereof and a cleaning roller 24b for absorbing an excessive ink attached to the discharge face 23a of the ink discharge head 23. In the head cap 24, the engagement projections 24a are engaged with one pair of engagement grooves 21a provided in a side of a discharge face 23a of the ink discharge head 23 of the cartridge main body 21; and the head cap 24 moves along the one pair of engagement grooves 21a in an arrow A direction in FIG. 2, thereby opening and closing the discharge face 23a of the ink discharge head 23. Then, in the had cap 24, when the cleaning roller 24b is rotated while coming into contact with the discharge face 23a of the ink discharge head 23 at the time of opening and closing operation, it absorbs an excessive ink and cleans up the discharge face 23a of the ink discharge head 23. For the cleaning roller 24b, for example, a member with high hygroscopicity, specifically sponge, non-woven fabrics, woven fabrics, and so on is used. When the printing is not operated, the head cap 24 closes the discharge face 23a such that the ink within the ink discharge head 23 is not dried.

Next, the device main body 3 in which the thus configured head cartridge 2 is installed will be described with reference to the accompanying drawings.

As illustrated in FIG. 1, the head cartridge 2 is installed in a head cartridge installation part 71. The device main body 3 is mounted with a paper feed tray 73 in which recording papers P prior to printing are stacked and accommodated in a paper feed port 72 provided in a lower side of a front face thereof and mounted with a paper discharge tray 75 for accommodating the recording papers P after printing in a paper discharge port 74 provided in an upper side of the front face.

Figure 7:
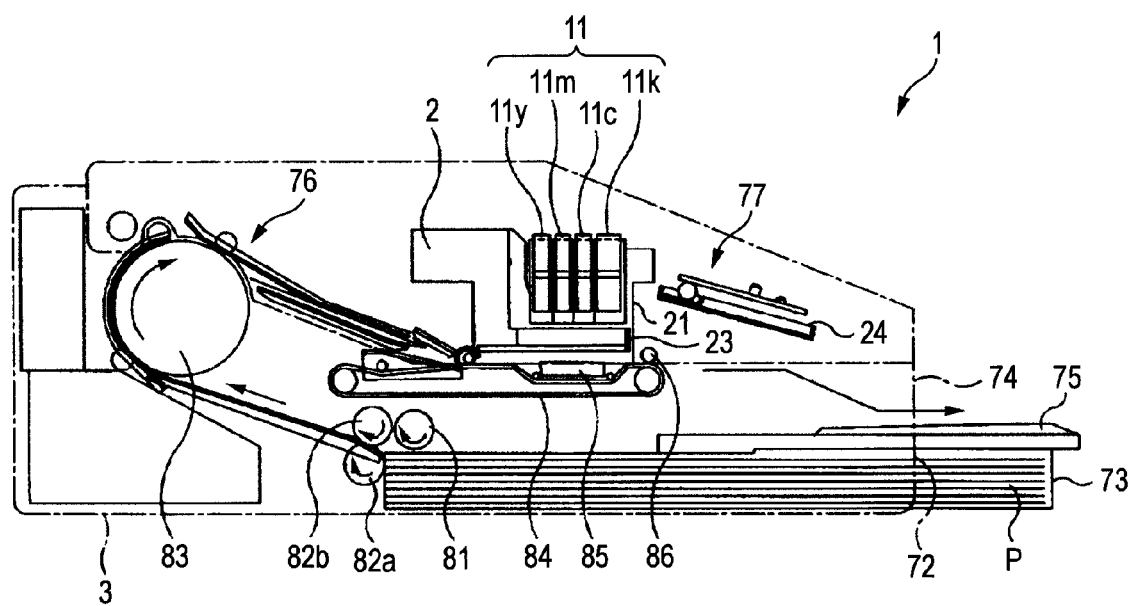
FIG. 7 is a perspective side view to show a part of this printer device.

As illustrated in FIG. 7, the device main body 3 is provided with a paper feed and discharge mechanism 76 for conveying the recording paper P and a cap opening and closing mechanism 77 for opening and closing the head cap 24 provided on the discharge face 23a of the head cartridge 23.

According to the foregoing configuration, the printer device 1 is controlled by a control part provided in a control circuit for controlling the feed of a current to be fed into the feed and discharge mechanism 76, the head cap opening and closing mechanism 77 and the ink discharge head 23 on a basis of printing data inputted from an externally provided information processor.

Concretely, in the printer device 1, first of all, when the control part is ordered to start printing by the operation of an operation button 3a provided in the device main body 3, the paper feed and discharge mechanism 76 and the head cap opening and closing mechanism 77 are driven by a control signal from the control part, whereby the printer device 1 becomes in a state that printing is possible as illustrated in FIG. 7.

In the printer device 1, the head cap 24 is moved from the bottom face of the head cartridge 2 into the front face side provided with the paper feed tray 73 and the paper discharge tray 75 due to the head cap opening and closing mechanism 77. Thus, in the printer device 1, the nozzle 62a provided on the discharge face 23a of the ink discharge head 23 is exposed to the outside, thereby enabling it to discharge the ink.

In the printer device 1, the recording paper P is drawn out from the paper feed tray 73 by a paper feed roller 81 due to the paper feed and discharge mechanism 76, and only one sheet of the recording paper P is drawn out by one pair of separation rollers 82a, 82b rotating in an opposite direction to each other. Then, in the printer device 1, the recording paper P thus drawn out is conveyed onto a reverse roller 83 provided in the back side of the device main body 3 and reversed towards the front face side of the device main body 3 by the reverse roller 83 and is then conveyed onto a conveyance belt 84 provided in a position opposing to the discharge face 23a of the ink discharge head 23. In the printer device 1, by supporting the recording paper P conveyed by the conveyance belt 84 in a prescribed position by a platen plate 85, the recording paper P is made opposite to the discharge face 23a.

Next, in the printer device 1, a drive current is fed into the plural heating resistors 61a provided in the ink discharge head 23 on a basis of a control signal of printing data, thereby heating the heating resistors 61a. In the printer device 1, as illustrated in FIGS. 6A and 6B, the foregoing ink is discharged in a droplet state onto the conveyed recording paper P in a position opposing to the discharge face 23a from the nozzle 62a by heating the heating resistors 61a, thereby printing images, letters or the like.

Then, in the printer device 1, when the ink droplet is discharged from the nozzle 62a, an ink of the same amount as the discharged amount of the ink is fed into the ink discharge head 23 from the ink cartridge 11 via the valve mechanism 34 of the connection part 25.

Next, in the printer device 1, the recording paper P in which printing of images, letters or the like has been finished is sent out by the conveyance belt 84 rotating in a direction of the paper discharge port 74 and a paper discharge roller 86 opposing to the conveyance belt 84 and provided in a side of the paper discharge port 74 than the discharge face 23a, whereby the recording paper P after printing is discharged into the paper discharge tray 75. In the printer device 1, printing is carried out on the recording paper P in this manner.

In the thus described printer device 1, since at least one of the cyclic aliphatic compound represented by the chemical formula (1) or the cyclic aliphatic compounds represented by the chemical formulae (2) to (4) is contained in the ink to be accommodated in the ink cartridge 1, not only the wettability against an inner face of, for example, the valve mechanism 34, the ink compartment 65, or the nozzle 62a within the ink discharge head 23 is enhanced, but also the formation of a fine bubble in the ink compartment 65 or the nozzle 62a during the movement in the valve mechanism 34 or the ink passage 64 can be prevented from occurring. Thus, in the ink discharge head 23, since deficient discharge such as non-discharge of the ink due to a bubble and bending of a discharge direction is prevented, high-grade images or letters which are free from blurring or deletion can be printed.

In this printer device 1, since at least one of the foregoing cyclic aliphatic compound represented by the chemical formula (1) is contained in the ink, the wettability of an ink droplet against the recording paper P is enhanced, and high-grade images or letters which are high in optical density and free from bleeding of boundaries and unevenness of mixed color can be printed.

In this printer device 1, especially when the ethylene oxide adduct of a branched alkyl diol represented by the chemical formula (5) is contained as a surfactant, the wettability against various sizing agents in the recording paper P, such as surface sizing agents and internal sizing agents, becomes higher coupled with the effect of the cyclic aliphatic compound. Thus, images or letters which are further improved in the generation of blurring of boundaries and unevenness of mixed color and which have a higher quality than that in the case of not containing the ethylene oxide adduct of a branched alkyl diol represented by the chemical formula (5) can be printed.

Incidentally, though the printer device 1 employs an electro-thermal conversion system for discharging an ink from the nozzle 62a upon heating by the heating resistor 61a, it should not be construed that the invention is limited to this system. For example, an electromechanical conversion system (see, for example, JP-A-55-65559, JP-A-62-160243 and JP-A-2-270561) for electromechanically discharging an ink from a nozzle by using an electromechanical conversion element such as a piezoelectric element, for example, a piezo element may be employed.

While the printer device 1 has been described with reference to the line type printer device 1 as one embodiment, it should not be construed that the invention is limited thereto. For example, a serial type liquid discharge device for performing printing while moving an ink discharge nozzle in a width direction of the recording paper P can be applied, too.

While the embodiment of the invention has been described with reference to a printer device, it should not be construed that the invention is limited thereto, but the invention can be widely applied to other liquid discharge devices for discharging a liquid. For example, the invention can be applied to facsimiles and copiers.

EXAMPLES

Examples and Comparative Examples in which an ink according to the embodiment of the invention was actually prepared will be hereunder described.

Example 1

In Example 1, a yellow ink was prepared in the following manner. That is, in preparing a yellow ink, 4% by weight of Acid Yellow 142 as a coloring matter, 76.7% by weight of water as a solvent, 10% by weight of glycerin as other solvent, 5% by weight of 1,3-butanediol, 3% by weight of 2-pyrrolidone, 1% by weight of 4-methyl-2-(1-hydroxymethyl)cyclohexanol represented by the chemical formula (1) as a cyclic aliphatic compound, and 0.3% by weight of an ethylene oxide adduct of acetylene glycol (OLFINE E1010, manufactured by Nissin Chemical Industry Co., Ltd.) as a surfactant were mixed and filtered through a membrane filter (a trade name: Millex-0.22, manufactured by Millipore Corporation) having a pore size of 0.22 μm, thereby preparing a yellow ink.

Furthermore, in Example 1, a black ink was prepared in the following manner. That is, in preparing a black ink, 4% by weight of Food Black 2 as a coloring matter, 76.7% by weight of water as a solvent, 10% by weight of glycerin as other solvent, 5% by weight of 1,3-butanediol, 3% by weight of 2-pyrrolidone, 1% by weight of 4-methyl-2-(1-hydroxymethyl) cyclohexanol as a cyclic aliphatic compound, and 0.3% by weight of an ethylene oxide adduct of acetylene glycol (OLFINE E1010, manufactured by Nissin Chemical Industry Co., Ltd.) as a surfactant were mixed, thereby preparing a black ink.

Example 2

In Example 2, a yellow ink and a black ink were each prepared in the same manner as in Example 1, except for using 5-ethyl-2-(1-hydroxymethyl)cyclohexanol represented by the chemical formula (2) as a cyclic aliphatic compound in place of the 4-methyl-2-(1-hydroxymethyl)cyclohexanol.

Example 3

In Example 3, a yellow ink and a black ink were each prepared in the same manner as in Example 1, except for using 5-methyl-2-(1-hydroxyethyl)cyclohexanol represented by the chemical formula (3) as a cyclic aliphatic compound in place of the 4-methyl-2-(1-hydroxymethyl)cyclohexanol.

Example 4

In Example 4, a yellow ink and a black ink were each prepared in the same manner as in Example 1, except for using 5-ethyl-2-(1-hydroxyethyl)cyclohexanol represented by the chemical formula (4) as a cyclic aliphatic compound in place of the 4-methyl-2-(1-hydroxymethyl)cyclohexanol.

Example 5

In Example 5, a yellow ink and a black ink were each prepared in the same manner as in Example 3, except for using an ethylene oxide adduct of 2-ethyl-2-n-butyl-1,3-propanediol represented by the chemical formula (5) (addition molar number of ethylene oxide: 2 moles in average) as a surfactant in place of the ethylene oxide adduct of acetylene glycol (OLFINE E1010, manufactured by Nissin Chemical Industry Co., Ltd.).

Example 6

In Example 6, a yellow ink and a black ink were each prepared in the same manner as in Example 4, except for using an ethylene oxide adduct of 2-ethyl-2-n-butyl-1,3-propanediol (addition molar number of ethylene oxide: 2 moles in average) as a surfactant in place of the ethylene oxide adduct of acetylene glycol (OLFINE E1010, manufactured by Nissin Chemical Industry Co., Ltd.).

Comparative Example 1

In Comparative Example 2, a yellow ink and a black ink were each prepared in the same manner as in Example 1, except for not using a cyclic aliphatic compound and changing the amount of water to 77.7% by weight.

Comparative Example 2

In Comparative Example 1, a yellow ink and a black ink were each prepared in the same manner as in Example 1, except for using 1,2-cyclohexanediol in place of the 4-methyl-2-(1-hydroxymethyl)cyclohexanol.

Next, with respect to the yellow inks and black inks of Examples 1 to 4 and Comparative Examples 1 to 2, the discharge stability, bleeding of boundaries, optical density of black ink and unevenness of mixed color were evaluated. The evaluation results are shown in the following Table 1.

TABLE 1

| Example and Comparative Example | Discharge stability | Bleeding of boundaries | Optical density | Unevenness of mixed color |
|---|---|---|---|---|
| Example 1 | B | B | 1.18 | B |
| Example 2 | A | B | 1.18 | B |
| Example 3 | A | B | 1.2 | B |
| Example 4 | A | B | 1.19 | B |
| Example 5 | A | A | 1.22 | A |
| Example 6 | A | A | 1.21 | A |
| Comparative Example 1 | D | D | 1.1 | D |
| Comparative Example 2 | C | D | 1.12 | D |

Incidentally, the discharge stability was evaluated in the following manner. That is, each of the black inks prepared in the Examples and Comparative Examples was filled in an ink cartridge and installed in a head cartridge and then discharged by a line type inkjet printer device. Thereafter, after once removing the head cartridge from the inkjet printer device, this head cartridge was stored in an atmosphere at a temperature of 10° C. and a humidity of 50% for 5 days and additionally stored in an atmosphere at a temperature of 40° C. and a humidity of 50% for 5 days, followed by exposing under an environment at a temperature of 20° C. and a humidity of 50%. Then, the head cartridge was again mounted in the line type inkjet printer device and subjected to so-called solid printing, i.e., printing of painting over a prescribed region with respect to each color on copying paper (a trade name: MY PAPER, manufactured by Ricoh Company, Ltd.). Immediately thereafter, an ink tank was removed from the head cartridge, and whether or not a fine bubble was formed within an ink discharge head was evaluated by visual observation. Also, the printed image was visually observed and evaluated.

In the evaluation of the discharge stability, the case where deletion is not found on the whole of the image and a fine bubble of the ink within the ink discharge head is not formed is defined as "A"; the case where though there is no problem in the image quality, deletion is slightly found in the image and an extremely small amount of a fine bubble of the ink is formed within the ink discharge head is defined as "B"; the case where deletion is found to such a degree that the image quality is deteriorated and an extremely small amount of a fine bubble of the ink is formed within the ink discharge head is defined as "C"; and the case where deletion is found to such a degree that the image quality is deteriorated and a large amount of a fine bubble of the ink is formed within the ink discharge head is defined as "D".

The bleeding of boundaries was evaluated in the following manner. That is, each of the inks was filled in an ink tank and installed in a head cartridge, and the yellow and black colors were subjected to 100% solid printing adjacent to each other on copying paper (a trade name: PB PAPER, manufactured by Canon Inc.) by a line type inkjet printer device. The state of bleeding of boundaries of each color in the printed image was evaluated by visual observation.

In the evaluation of the bleeding of boundaries, the case where bleeding of each color is not found at all in boundaries is defined as "A"; the case where though there is no problem in the image quality, bleeding of each color is found a little in boundaries is defined as "B"; the case where bleeding of each color is found in boundaries to such a degree that the image quality is deteriorated is defined as "C"; and the case where bleeding of each color is found in the whole of boundaries and the image quality is remarkably deteriorated is defined as "D".

With respect to the optical density, the optical density of the black 100% solid printed part as printed for evaluating the bleeding of boundaries was measured by a Macbeth RD918 and evaluated.

The unevenness of mixed color was evaluated in the following manner. That is, each of the inks was filled in an ink tank and installed in a head cartridge, and the respective colors were subjected to solid printing with a density of 80% such that they were superposed on each other on copying paper (a trade name: PB PAPER, manufactured by Canon Inc.) by a line type inkjet printer device. Then, uniformity of color density in the printed image, namely the presence or absence of unevenness of color was evaluated by visual observation.

In the evaluation of the unevenness of mixed color, the case where unevenness of color is not found at all in the image solid-painted in mixed color is defined as "A"; the case where though there is no problem in the image quality, unevenness of color is slightly found in the image is defined as "B"; the case where unevenness of color is found to such a degree that the image quality is deteriorated is defined as "C"; and the case where unevenness of color is found on the whole of the image and the image quality is remarkably deteriorated is defined as "D".

From the results as shown in Table 1, the yellow inks and black inks of Examples 1 to 6 were satisfactory in all of the discharge stability, bleeding of boundaries, optical density and unevenness of mixed color as compared with the yellow inks and black inks of Comparative Examples 1 and 2. In Comparative Example 1, since a cyclic aliphatic compound is not contained in the ink, the wettability of the ink against an inner face of the ink discharge head of the head cartridge is low, a fine bubble is liable to be formed in the ink. For that reason, in Comparative Example 1, the formed bubble attached to the ink discharge head, for example, the inner face of the nozzle; non-discharge of the ink was caused; the discharge direction was bent; the discharge stability was deteriorated; and deletion was caused. Furthermore, in Comparative Example 1, since a cyclic aliphatic compound is not contained in the ink, the wettability against the sizing agent of paper was low; the optical density was low; and bleeding of boundaries and unevenness of mixed color were caused.

In Comparative Example 2, 1,2-cyclohexanediol which is not the cyclic aliphatic compound represented by the chemical formula (1) was contained in the ink; the wettability of the ink could not be made low; and a fine bubble was liable to be formed. Thus, in Comparative Example 2, a fine bubble formed in the ink attached to an inner face of the nozzle or the like; non-discharge of the ink was caused; the discharge direction of the ink was bent; the discharge stability was deteriorated; and deletion was caused so that the image quality was deteriorated. Furthermore, in Comparative Example 2, since 1,2-cyclohexanediol which is not the cyclic aliphatic compound represented by the chemical formula (1) was contained in the ink, the wettability against the sizing agent of paper was low; the optical density was low; and bleeding of boundaries and unevenness of mixed color were caused.

In contrast, in Examples 1 to 4, as described previously, since a specified cyclic aliphatic compound is contained in the ink, the wettability of the ink against the inside of the ink discharge head of the head cartridge is high, and the formation of a fine bubble in the ink is prevented from occurring. Thus, in Examples 1 to 4, since a fine bubble does not exist in the ink, nozzle clogging was not caused, and the discharge stability became satisfactory.

In Examples 1 to 4, since the cyclic aliphatic compound represented by any one of the chemical formulae (1) to (4) is contained in the ink, the wettability against the sizing agent of paper was high; the optical density was high; and neither bleeding of boundaries nor unevenness of mixed color was caused.

In Examples 2 to 4, since 5-ethyl-2-(1-hydroxymethyl)cyclohexanol, 5-methyl-2-(1-hydroxyethyl)cyclohexanol and 5-ethyl-2-(1-hydroxyethyl)cyclohexanole, all of which are especially excellent in solubility in water and an ability to reduce a surface tension, are contained in the ink, respectively, the wettability of the ink is higher, and the formation of a fine bubble is prevented from occurring. Thus, in Examples 2 to 4, high-grade images having more excellent discharge stability than Example 1 were obtained.

In addition, in Examples 5 and 6, because of use of an ethylene oxide adduct of 2-ethyl-2-n-butyl-1,3-propanediol (addition molar number of ethylene oxide: 2 moles in average) as a surfactant, the wettability against various sizing agents in the recording paper P, such as surface sizing agents and internal sizing agents, became higher coupled with the effect of the cyclic aliphatic compound, and a high-grade image in which the generation of blurring of boundaries and unevenness of mixed color was suppressed was obtained.

It should be understood by those skilled in the art that various modifications, combinations, sub-combinations and alternations may occur depending on design requirements and other factors insofar as they are within the scope of the appended claims or the equivalents thereof.

What is claimed is:

1. A recording liquid, comprising:
   a coloring matter,
   a solvent for dissolving or dispersing the coloring matter therein,
   at least one cyclic aliphatic compound represented by the following chemical formula (1):

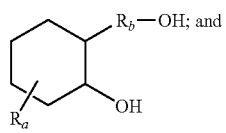

a surfactant represented by chemical formula (5):

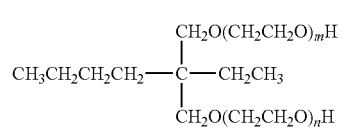

wherein,
   each of Ra and Rb represents an alkyl group of from 1 to 3 carbon atoms and $2 \leq (Ra+Rb) \leq 4$, each of m and n each represents an integer in a range from 0 to 10 and $1 \leq (m+n) \leq 10$, and
the surfactant is in the range of 0.1 to 5 wt %.

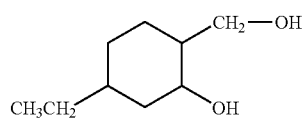

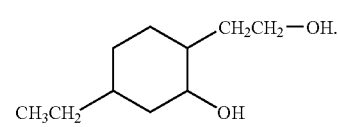

2. A liquid cartridge containing a recording liquid, the recording liquid comprising:
   a coloring matter;
   a solvent for dissolving or dispersing the coloring matter therein;
   at least one cyclic aliphatic compound represented by the following chemical formula (1):

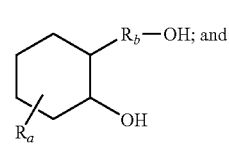

a surfactant represented by chemical formula (5):

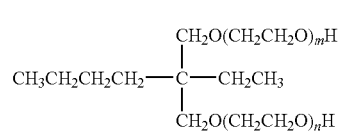

wherein,
   each of Ra and Rb represents an alkyl group of from 1 to 3 carbon atoms and $2 \leq (Ra+Rb) \leq 4$,
   each of m and n represents an integer in a range from 0 to 10 and $1 \leq (m+n) \leq 10$, and
   the surfactant is in an amount of 0.1 to 5 wt %

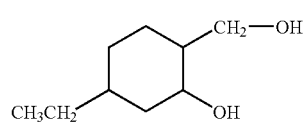

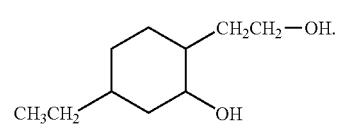

3. A liquid discharge device for discharging a recording liquid, comprising:
   a device main body;
   a head cartridge detachably attached to the device main body;

a liquid cartridge containing a recording liquid within the head cartridge;

a liquid compartment connected to the liquid cartridge via an ink inflow passage, the liquid compartment provided with a pressure producing element for pressing the recording liquid through the liquid compartment through an ink outflow passage; and a liquid discharge head connected to the ink outflow passage through which, the recording liquid is discharged, wherein, the recording liquid contains a coloring matter, a solvent for dissolving or dispersing the coloring matter therein, at least one cyclic aliphatic compound represented by the following chemical formula (1):

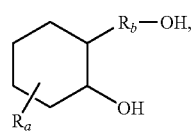
(1)

where each of Ra and Rb represents an alkyl group of from 1 to 3 carbon atoms and $[2 \leq (Ra+Rb) \leq 4]$, and a surfactant represented by chemical formula (5):

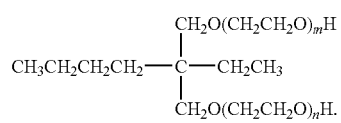
(5)

where each of m and n represents an integer in a range from 0 to 10 and $1 \leq (m+n) \leq 10$, and the surfactant is in the range of 0.1 to 5 wt %.

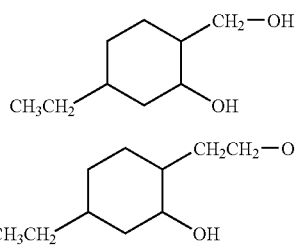
(2)

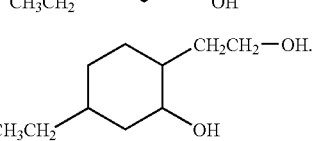
(4)

4. A liquid discharge method comprising the steps of:

using a liquid discharge device for discharging a recording liquid in a droplet state to an object for the purpose of recording on the object, the liquid discharge device including a device main body, and a liquid cartridge having a recording liquid therein, feeding the recording liquid in the liquid cartridge into a liquid compartment having an ink flow passage and an ink flow out passage via a feed passage connected to the ink flow passage;

adjusting the flow of the recording liquid in the liquid compartment via a pressure producing element;

feeding the recording liquid in the liquid compartment through the ink flow out passage to a discharge head; and discharging the recording liquid through from the discharge head, wherein, the recording liquid contains a coloring matter, a solvent for dissolving or dispersing the coloring matter therein, and at least one cyclic aliphatic compound represented by the following chemical formula (1):

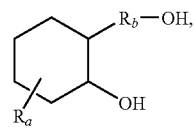
(1)

where each of Ra and Rb represents an alkyl group from 1 to 3 carbon atoms and $2 \leq (Ra+Rb) \leq 4$, and a surfactant represented by the chemical formula (5):

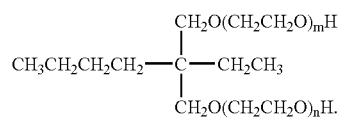
(5)

where each of m and n represents an integer in a range from 0 to 10 and $1 \leq (m+n) \leq 10$, and the surfactant is in the range of 0.1 to 5 wt %

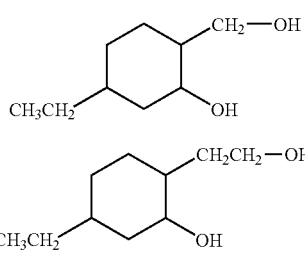
(2)

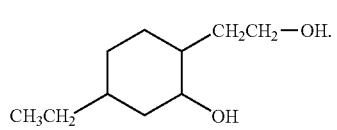
(4)

* * * * *